United States Patent [19]

Kitagawa

[11] Patent Number: 4,715,271
[45] Date of Patent: Dec. 29, 1987

[54] DISPOSABLE BEVERAGE BREWER
[75] Inventor: Keisuke Kitagawa, Chofu, Japan
[73] Assignee: Noazi Kasai, Japan
[21] Appl. No.: 890,934
[22] Filed: Jul. 31, 1986
[51] Int. Cl.[4] .................. A47J 31/02; A47J 31/06
[52] U.S. Cl. ............................. 99/306; 206/616; 210/474
[58] Field of Search ............... 99/306, 323, 279, 295; 426/77, 82; 210/497.2, 473, 474, 497.2, 481; 206/605, 616

[56] References Cited
U.S. PATENT DOCUMENTS

| 23,230 | 3/1859 | Colt | 206/616 |
| 3,617,311 | 11/1971 | Paal | 206/616 |
| 4,519,911 | 5/1985 | Shimizu | 426/82 |
| 4,567,987 | 2/1986 | Lepisto | 206/616 |
| 4,584,101 | 4/1986 | Kataoka | 99/306 |

Primary Examiner—Robert W. Jenkins
Attorney, Agent, or Firm—Arnold S. Weintraub

[57] ABSTRACT

Disclosed is a disposable hot beverage brewer comprised of three sections which bend along fold lines. One section further comprises a vertical fold line through its center. A filter is provided in registry with the inner faces of the three sections. Before use, the device folds flat. In use, it is opened into a triangular configuration which may be set on top of a mug or other container. Coffee, for example, is placed on the filter and hot water poured therethrough.

6 Claims, 8 Drawing Figures

FIG.I(a)
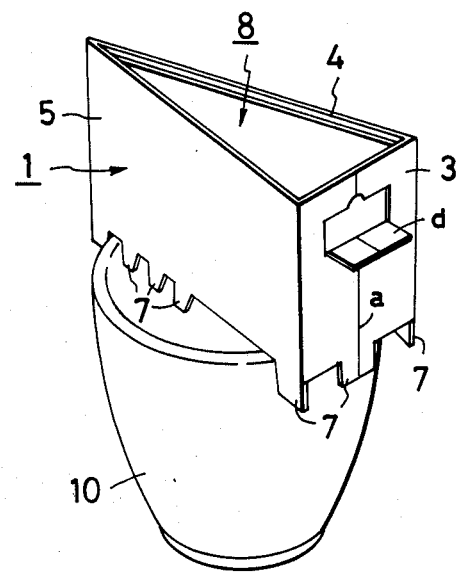
FIG.I(b)
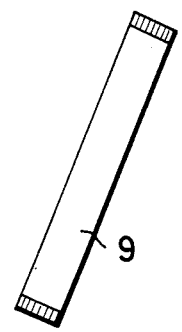
FIG 2
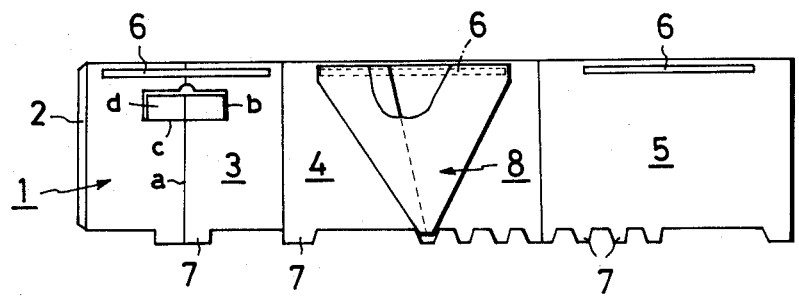

DISPOSABLE BEVERAGE BREWER

FIELD OF THE INVENTION

The present invention relates to a device used to filter brew beverages such as ground coffee, black tea, green tea and the like and more particularly relates to a device which can be placed on and fixed to containers of different sizes and then be discarded after use.

BACKGROUND OF THE INVENTION

Hitherto, ground coffee, black tea and the like have been prepared in a bottle, a can and the like for which purpose a special filter apparatus is required. This filter apparatus must be washed, cleaned and dried by every time it is used and the operation is troublesome and time consuming.

Also, if a large quantity of coffee and the like in a bottle, a can and the like is drunk on several occasions over a period of time, the quality deteriorates inferior with the lapse of time. It would be desirable if the coffee and the like were packed separately one by one, and if a disposable filter apparatus were utilized when the separately packed coffee and the like are brewed.

SUMMARY OF THE INVENTION

The present invention is intended to overcome the prior art deficiencies. It is a filter brewer which folds flat until the time of use. When it is desired to filter brew a hot beverage, the filter brewer may be unfolded into a stable triangular configuration and set on top of a container. For a more complete understanding of the present invention, reference is made to the following detailed description and accompanying drawing. In the drawing like reference characters refer to like parts throughout the several view in which:

BRIEF DESCRIPTION OF THE DRAWING

FIG. 1 is a perspective of the expanded filter brewer of the present invention ready for use;

FIG. 2 is a view of the unfolded inner surface of the device of FIG. 1.

DETAILED DESCRIPTION OF THE DRAWING

Figure 3:
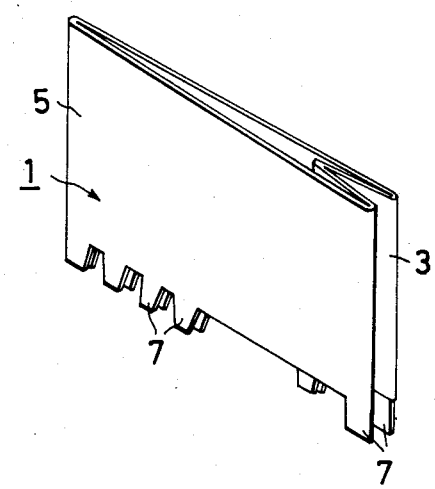
FIG. 3 is a perspective view of the device of FIG. 1 folded flat.

Referring now to an embodiment of the present invention illustrated in FIG. 1 to FIG. 4, the numeral 1 indicates a pre-form of the filter brewer. The pre-form 1 is made by laminating plastic foil, aluminum foil and the like to a paste-board substrate, and comprises adhesive piece 2, side section 3, front section 4, and rear section 5 separated from each other by fold-lines. The center portion of the side section 3 is provided with a longitudinal fold-line a, thereby permitting said side section to be folded in two. A supporting piece d is formed on the inner face of side section 3 by a downward Japanese "ko"-shaped cut b in the upper portion thereof and a lateral broken curve C joining both lower edges of cut b. An adhesive paste 6 is coated on the upper portions of side 3, front section 4 and rear section 5. Several projections 7 project from the lower edge of pre-form 1 and comprise a notched edge along a portion thereof.

Pre-form 1 formed in accordance with the present invention is also provided with specially prepared funnel-shaped filter 8 in registry with the inner face of the pre-form 1, and the upper edge of the filter 8 is formed to adhere thereto. by utilizing the adhesive paste 6. A triangular configuration is formed by bending pre-form 1 along its fold-lines. The filter brewer can be folded flat and may be formed into a triangular configuration by one motion. The numeral 9 in the drawing is a coffee-pack in which ground coffee is packed separately.

Figure 4:
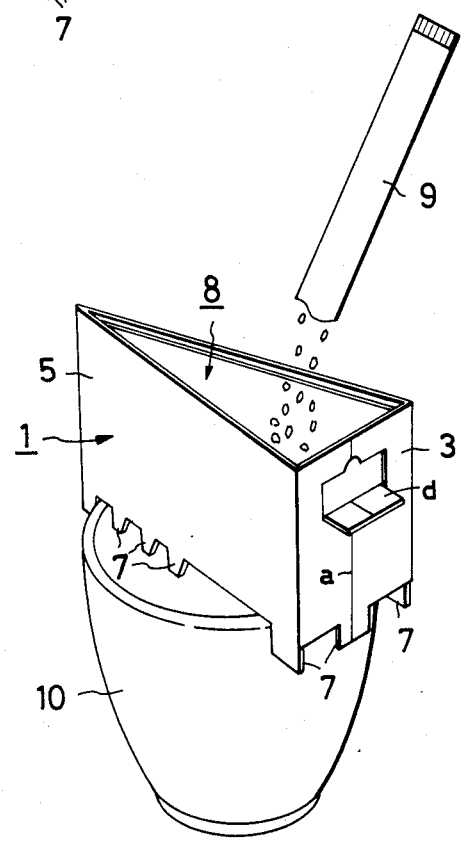
FIG. 4 is a perspective view showing the device of FIG. 1 in use.

On the occasion of usage of the filter-brewer in accordance with the present invention, as shown in FIG. 1 and FIG. 4, the flat pre-form 1 is folded into the triangular configuration by one motion, the filter 8 being opened into a funnel-shape simultaneously by this motion. Supporting piece d in registry with side section 3 is bent down and maintained horizontally preventing side section 3 from bending. The filter brewer is then placed on a cup 10 utilizing the projections 7 to hold it in place. Subsequently, the filter brewer is filled from the coffee pack 9. Coffee is then brewed right in the cup 10 by pouring hot water into the filter brewer.

Since the filter brewer in accordance with the present invention has the structure and operation as mentioned above, the filter may be opened with one simple motion, and said filter brewer may be placed on cups of differing sizes and remain stable thereon. Further, since the filter brewer may be produced in large quantities at a low price, therefore it is feasible to use it once and discard it.

Figure 5:
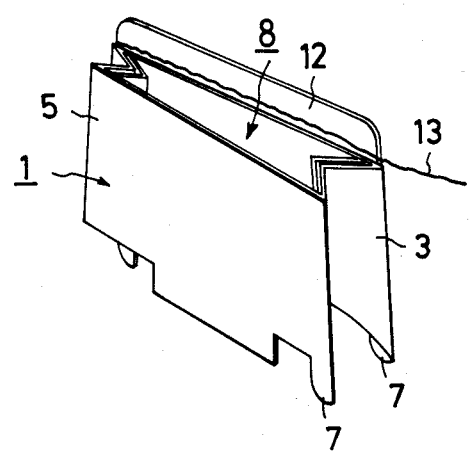
FIG. 5 is a perspective view of another embodiment of the present invention.
Figure 6:
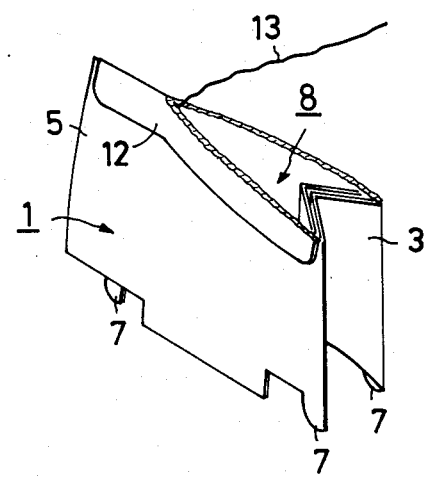
FIG. 6 is a perspective view showing the device of FIG. 5 being opened for use.
Figure 7:
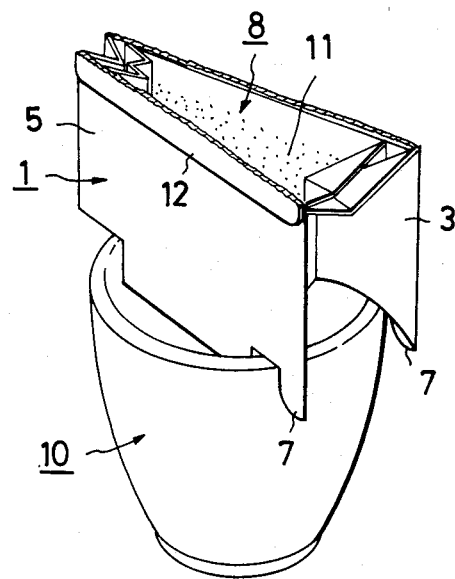
FIG. 7 is a perspective view showing the device of FIG. 5 in use.

In another embodiment of the present invention, the filter 8 may be pre-filled with an appropriate amount of coffee 11 as shown in FIG. 5 to FIG. 7. In this case, a cover 12 is fitted over the opening formed by the triangular configuration formed from pre-form 1 to form a tight seal therewith.

Futher, in order to cut cover 12 quickly, a tearing thread 13 is provided at the base of the cover 12, as shown in the drawings. Cover 12 is cut by pulling this thread 13, thereby opening the filter brewer.

A fixed quantity of coffee, black tea, green tea and the like may be pre-inserted into the filter brewer in this manner, resulting in a convenient device since the coffee and the like can be brewed by simply opening the filter brewer and pouring in hot water.

What is claimed is:

1. A filter brewer of triangular configuration comprising three planar side member defining an upper and a lower opening therein, a funnel-shaped filter in registry with the inner faces of the three side members, and
    means forming a plurality of notches formed on lower edges of the three side members, said plurality of notches being adapted to engage the upper edge of a container with the lower edges of the three side members supported thereon.

2. The device of claim 1 wherein one of the planar side members further comprises a vertical fold-line coinciding with the center thereof whereby the device may be collapsed into a flat configuration by folding the side member along the fold-line thereof.

3. The device of claim 2 further comprising means for preventing the filter brewer from bending along the fold line in the one planar side member.

4. The device of claim 3 wherein the means for preventing comprises a flap extending laterally through the fold line, which flap may be bent downward and maintained horizontally.

5. The device of claim 1 further comprising a cover integtral with at least two of the three side members and having a base adjacent to one of at the least two side members.

6. The device of claim 5 further comprising a tear thread extending along the base of the cover.

* * * * *